(12) United States Patent
Manett

(10) Patent No.: US 11,248,440 B2
(45) Date of Patent: Feb. 15, 2022

(54) VALVE SEAT AND VALVE

(71) Applicant: Expro North Sea Limited, Dyce (GB)

(72) Inventor: Kris Manett, Fraserburgh (GB)

(73) Assignee: Expro North Sea Limited, Dyce (GB)

( * ) Notice: Subject to any disclaimer, the term of this patent is extended or adjusted under 35 U.S.C. 154(b) by 87 days.

(21) Appl. No.: 16/639,991

(22) PCT Filed: Aug. 8, 2018

(86) PCT No.: PCT/GB2018/052263
§ 371 (c)(1),
(2) Date: Feb. 18, 2020

(87) PCT Pub. No.: WO2019/034848
PCT Pub. Date: Feb. 21, 2019

(65) Prior Publication Data
US 2020/0199968 A1 Jun. 25, 2020

(30) Foreign Application Priority Data
Aug. 18, 2017 (GB) .................................... 1713253

(51) Int. Cl.
*E21B 34/04* (2006.01)
*F16K 5/06* (2006.01)
*F16K 5/08* (2006.01)

(52) U.S. Cl.
CPC .......... *E21B 34/045* (2013.01); *F16K 5/0605* (2013.01); *F16K 5/08* (2013.01); *E21B 2200/04* (2020.05)

(58) Field of Classification Search
CPC ........ F16K 5/0605; F16K 5/08; E21B 34/045; E21B 2200/04
See application file for complete search history.

(56) References Cited

U.S. PATENT DOCUMENTS

| | | | |
|---|---|---|---|
| 1,679,779 A | 8/1928 | Oberhuber | |
| 2,323,398 A * | 7/1943 | Irwin | B23C 3/05 408/199 |
| 2,385,589 A * | 9/1945 | Shepler | B23C 3/05 408/83.5 |
| 3,077,896 A * | 2/1963 | Weingard | F16K 1/14 137/329.06 |
| 3,360,235 A * | 12/1967 | Myers | E21B 34/12 251/95 |
| 4,009,753 A * | 3/1977 | McGill | E21B 29/04 166/55.1 |
| 4,651,610 A * | 3/1987 | Schwelling | B30B 9/3003 100/98 R |
| 6,152,229 A | 11/2000 | Jennings | |
| 9,617,812 B2 * | 4/2017 | Lee | E21B 21/103 |

(Continued)

*Primary Examiner* — Michael R Reid
(74) *Attorney, Agent, or Firm* — Getz Balich LLC

(57) ABSTRACT

A valve seat for a valve is disclosed, the valve seat facilitating cutting of a body located within the seat. The valve seat includes a sealing surface for sealing with a valve member and an annular cutting component having a plurality of cutting teeth. The cutting teeth are circumferentially spaced and each defines an elongate crest. A valve is disclosed having a housing with a bore), a valve member and the valve seat. The valve seat is arranged within the housing in communication with the housing bore. The valve member is movable relative to the housing between an open position and a closed position.

19 Claims, 10 Drawing Sheets

(56) References Cited

U.S. PATENT DOCUMENTS

| | | |
|---|---|---|
| 10,450,834 B2 | 10/2019 | Manett |
| 2010/0051847 A1 | 3/2010 | Mailand |
| 2013/0015387 A1 | 1/2013 | Biwanski |
| 2014/0175317 A1 | 6/2014 | Tennant |
| 2016/0060995 A1 | 3/2016 | Skeels |
| 2017/0130549 A1 | 5/2017 | Kroesen |

* cited by examiner

VALVE SEAT AND VALVE

This application claims priority to PCT Patent Appln. No. PCT/GB2018/052263 filed Aug. 8, 2018, which claims priority GB Patent Appln. No. 1713253.1 filed Aug. 18, 2017, which are herein incorporated by reference.

BACKGROUND OF THE INVENTION

1. Technical Field

The present invention relates to a valve seat for a valve, the valve seat facilitating cutting of a body located within the seat. The present invention also relates to a valve comprising the valve seat. In particular, but not exclusively, the present invention relates to valve seat for use in a valve comprising the valve seat and a valve member which is movable between an open position and a closed position, the valve member cooperating with the valve seat to cut a body located within the seat when the valve member is moved to its closed position.

2. Background Information

In the oil and gas exploration and production industry, wellbore fluids comprising oil and/or gas are recovered to surface through a wellbore which is drilled from surface. The wellbore is lined with metal wellbore-lining tubing, which is known in the industry as casing. The casing is cemented in place within the drilled wellbore, and serves numerous purposes including: supporting drilled rock formations; preventing undesired ingress/egress of fluid; and providing a pathway through which further tubing and downhole tools can pass.

Numerous tubing strings and tools are run-in to the well during a procedure to complete the well in preparation for production, as well as during subsequent production of well fluids and any intervention procedures which may need to be carried out during the lifetime of the well. For example, well fluids are recovered through production tubing which is installed within the cased well, extending from the surface to the region of a producing formation. Tool strings are run-into the well, carrying downhole tools for performing particular functions within the well. Coiled tubing and wireline can be employed as an efficient method of running a downhole tool into a well.

Safety legislation requires the provision of a blow-out preventer (BOP), comprising an arrangement of shear and seal rams, which provides ultimate pressure control of the well. In an emergency situation, seal rams can seal around tubing extending through the BOP, to seal an annulus around the tubing. If required, shear rams can be activated to sever tubing and/or wireline extending through the BOP, to shut-in in the well. Other valve assemblies are provided as part of tubing strings that are run-into and located within the well. Examples include subsurface safety valves (SSSVs), which are typically installed in an upper part of the wellbore, and subsea test trees (SSTTs), which are typically installed in a lower part of the wellbore. SSSVs and SSTTs can close producing conduits in the event of an emergency.

SSSVs and SSTTs comprise an arrangement of valves which are required to perform a cutting and/or sealing function. This is to ensure safe cutting of tubing (such as coiled tubing) extending through the valves, and subsequent sealing of the SSSV/SSTT bore. Numerous different types of valves can be used including ball valves, gate valves and flapper valves, the latter having a purely sealing function.

Ball-type valves comprise a ball member which is rotatable between an open position in which a bore of the ball member is aligned with a bore of a housing in which the ball member is mounted, and a closed position in which the bore of the ball member is disposed transverse to the housing bore, thereby closing the valve. Gate-type valves comprise a sliding gate which is moved in a direction transverse to a bore of a housing containing the gate, to selectively open and close the housing bore.

In the past, ball-type valves have often been preferred, as they are of a relatively compact diameter, in comparison to other types of valves. This is because the structure required to actuate a ball cage coupled to the ball member (for moving it between its open and closed positions) can be located axially above the ball member. This is in contrast to other types of valves, particularly gate-type valves, which require that sufficient space be provided within the housing to store the gate when it is in an open position.

Separate cutting and sealing members can be provided, particularly in ball-type valves, which has benefits in terms of separating a cutting function from a sealing function. However, this does require that extra valves be provided for redundancy purposes, increasing an overall length of the SSSV/SSTT (or other valve assembly). Accordingly, it has often been preferred to employ valves comprising ball members which provide both a cutting and a sealing function. This has conventionally been achieved by providing a ball member having a cutting edge on a surface which intersects with the bore of the ball member, and a sealing surface which is spaced around a circumference of the ball member away from the cutting edge. The cutting edge acts to sever a body (e.g. tubing/wireline) located within the bore of the ball member on rotation towards its closed position. The sealing surface subsequently seals the ball member relative to a sealing surface on a valve seat provided in the housing of the valve, following movement of the ball member to its closed position.

In conventional shear and seal ball-type valves, it was found that the sealing surface on the ball member became damaged during actuation of the ball member to sever a body (particularly tubing) extending through the bore of the ball member. This provided a leak path past the ball member after movement to its closed (sealing) position, along an interface between the sealing surface on the ball member and the sealing surface on the seat. This required that the ball valve be removed for repairs after only a small number of uses, which is extremely costly and disruptive.

In an effort to address the problems associated with conventional shear and seal ball-type valves, the applicant developed an improved ball valve, which is disclosed in International Patent Publication No. WO-2016/113525, and which comprises a ball member having a specially shaped cutting surface on a leading edge. Options include a truncated leading edge cutting surface, and a relief region disposed proximate to a leading edge surface (as well as combinations of the two).

Whilst ball members of the type disclosed in WO-2016/113525 (particularly those with a relief region) have been found to greatly reduce damage to sealing surfaces on the ball members, there is a desire to further improve upon conventional ball valve designs, in an effort to ensure against damage to the sealing surface of the valve seat. In particular, it is desired to reduce the risk of the ball members becoming damaged due to the very high forces required to actuate the ball member to sever tubing, and which could damage the sealing surface on the valve seat during rotation to its closed position.

Whilst the problems discussed above have been described in particular relation to ball-type valves, it will be understood that similar problems can be encountered in valves of other types, including but not restricted to gate-type valves.

SUMMARY OF THE INVENTION

According to a first aspect of the present invention, there is provided a valve seat comprising: a sealing surface for sealing with a valve member; and a cutting component comprising a plurality of cutting teeth which are arranged to indent a surface of a body that is urged into contact with the cutting teeth, to facilitate cutting of the body.

The valve seat may form part of a valve comprising the valve seat and a valve member. The valve member may act to urge the body into contact with the cutting teeth. The valve member may be movable between an open position and a closed position. In the open position, the valve member may be out of sealing contact with the sealing surface. In the closed position, the valve member may be in sealing contact with the sealing surface.

According to a second aspect of the present invention, there is provided a valve comprising: a housing having a bore; a valve seat arranged within the housing in communication with the bore, the valve seat comprising a sealing surface and a cutting component comprising a plurality of cutting teeth; and a valve member which is movable relative to the housing between an open position where the housing bore is open and the valve member is out of sealing contact with the sealing surface of the valve seat, and a closed position where the housing bore is closed by the valve member and the valve member is in sealing contact with the sealing surface of the valve seat to thereby seal the bore; in which the plurality of cutting teeth of the valve seat cutting component are arranged to indent a surface of a body located within the housing bore, to facilitate cutting of the body, the body being urged into contact with the cutting teeth by the valve member when the valve member is moved to its closed position.

According to a third aspect of the present invention, there is provided a cutting component for a valve seat of a valve, the cutting component comprising a plurality of cutting teeth which are arranged to indent a surface of a body that is urged into contact with the cutting teeth, to facilitate cutting of the body.

The valve seat of the present invention offers advantages over prior valve seats in that the cutting teeth of the cutting component indent into a surface of a body which is urged into contact with the teeth, thereby imparting point loads on the body. The resulting stress concentrations in the body greatly improve the efficiency of a procedure to cut (or sever) the body, and can significantly reduce a load which must be imparted on the body to cut it, in particular by the valve member. This has the benefit of reducing the risk of the valve member becoming damaged during the procedure, and so reduces a risk of resultant damage to the sealing surface of the valve seat due to contact with the damaged valve member.

Further features of the valve seat, valve and cutting component of the present invention may be derived from the following text.

The cutting teeth may be arranged to indent and cut the surface of the body.

The valve seat may comprise a main seat part, which may define the sealing surface. The cutting component may be provided separately from the main seat part. The cutting component may be provided as an integral part of the valve seat, and so with the main seat part.

The cutting component may be mountable to or within the main seat part, and may be releasably mountable. The main seat part may define a recess, rebate or groove adapted to receive the cutting component. The cutting component may be arranged to be mounted to or within the main seat part in an interference fit. The cutting component may have an external dimension which is approximately the same as, and which may be the same as, an internal dimension of a portion of the main seat part within which the cutting component is to be mounted. The dimensions may be diameters.

The cutting component may be arranged to be mounted to or within the main seat part by deformation of the cutting component following positioning within the main seat part. Deformation may be achieved in an expansion procedure, which may be a swaging procedure. The cutting component may have an external dimension, prior to deformation, which may be less than an internal dimension of a portion of the main seat part within which the cutting component is to be mounted. The dimensions may be diameters.

The main seat part, and optionally also the valve member, may be of a material having a first hardness and/or modulus of elasticity. The cutting component may be of a material having a second hardness and/or modulus of elasticity. The second hardness and/or modulus of elasticity may be greater than the first hardness/modulus of elasticity. The valve member may be of a material having a third hardness and/or modulus of elasticity, which may be different from (optionally greater than) the first hardness/modulus of elasticity, but which is less than the second hardness/modulus of elasticity.

Provision of a cutting component of a material which is of a greater hardness and/or modulus of elasticity than the valve member may facilitate a procedure to cut the body, and in particular may reduce the loading which the valve member has to impart upon the body to cut it. This is because the cutting teeth, being of a material which is harder than that of the valve member, may effectively start to indent (and so cut) the body before the valve member. In particular, the cutting teeth may impart increased point loads upon the body, compared to cutting teeth of a material having the same hardness and/or modulus of elasticity to the valve member.

The cutting component may be provided as a one-piece component incorporating the teeth.

The cutting teeth may be provided separately. The cutting component may comprise a mounting member on which the cutting teeth are mounted. In this example, the cutting teeth may be provided of a material which is of a greater hardness and/or modulus of elasticity than a material of the mounting member.

The cutting teeth may be spaced apart along a dimension of the cutting component. The cutting teeth may define crests, which may be elongate. Elongate crests may provide an enhanced engagement with the body, and/or may facilitate cutting of the body. The crests may form or define a cutting surface or cutting edge. The crests may extend in a direction along a dimension of the cutting component. The crests may be aligned with or located on the dimension. The dimension may be a circumference. The crests may extend part-way around the circumference. The cutting teeth may be arranged on a common circumference of the cutting component. The cutting teeth may be at a common axial position along a length of the cutting component. The elongate crests of the cutting teeth may extend in a direction along the circumference of the cutting component. The cutting teeth may extend from a root to a crest, and may taper towards the crest. The cutting teeth may taper in more than one direction towards the crest. The cutting teeth may taper in a width direction, which direction may be taken along said dimension of the cutting component. The cutting teeth may taper in a depth direction, which may be perpendicular to a width dimension of the cutting component, and which may be taken in a direction which is parallel to an axis of a housing containing the seat. A trough may be defined between an adjacent pair or pairs of teeth, which may comprise a flank of one tooth and a flank of an adjacent tooth. The provision of such troughs may facilitate the cutting of smaller bodies, such as wireline or slickline, which may be directed by the trough to the roots of the adjacent teeth where the body can be cut.

The valve seat may define a bore, and the cutting teeth may face towards the bore.

The valve seat, and so the cutting component, may be generally annular/ring-shaped. The cutting teeth may be arranged around an internal circumference of the cutting component, and may face towards the seat bore. Cutting teeth may be arranged around substantially an entire circumference of the cutting component. This may provide the advantage that an orientation of the cutting component, relative to the valve member, may not impact upon cutting of the body. Alternatively, the cutting teeth may be arranged around only a part of a circumference of the cutting component.

The valve member may be rotatable between its open and closed positions. The valve may be a ball-type valve, and the valve member may be a ball-type member. The valve member may be translatable between its open and closed positions. The valve may be a sliding gate-type valve, and may be a shear gate-type valve.

The valve member may comprise a leading edge defining a cutting surface. The valve seat cutting component may be arranged to cooperate with the cutting surface of the valve member to cut the body. The cutting component may be arranged to cooperate in a scissors cutting arrangement. The cutting component may be arranged so that the cutting teeth, in particular crests of the cutting teeth, are staggered relative to the cutting surface of the valve member, at least when the valve member is in its closed position. The teeth may be staggered in a direction which is parallel to a main axis of seat and/or a housing containing the seat.

The valve member may be a ball member of the type disclosed in the applicant's International Patent Publication No. WO-2016/113525, the disclosure of which is incorporated herein by way of reference. The ball member may comprise a sealing surface, a bore surface and a leading edge surface extending between the sealing surface and the bore surface, the leading edge surface being configured to cut the body. The leading edge surface may be truncated. The ball member may comprise a relief region disposed proximate the leading edge surface.

The sealing surface of the valve seat may be arcuate, in a plane which intersects with a main axis of the seat and contains the main axis. The sealing surface may have a curvature which matches that of an external surface of the valve member, where the valve member is a ball-type member. This may enable movement of the valve member to the closed position, and sealing of the valve member relative to the seat. The cutting component may have an axial end surface. The axial end surface may be formed at least partly by the cutting teeth, optionally by flanks of the cutting teeth. The end surface may be curved. A curvature of the end surface of the cutting component may match that of the sealing surface of the valve seat. The end surface of the cutting component may lie on an arc which intersects with an arc containing the arcuate sealing surface of the valve seat. An end face of the cutting component may be substantially planar and disposed transverse to a main axis of the valve seat/a housing containing the seat. The end surface may be arranged so that it is generally aligned with a part of the sealing surface disposed proximate to the cutting component.

The cutting component may comprise at least one rebate, recess or relief region, which may be disposed adjacent and/or proximate to the cutting teeth. The provision of such a rebate may avoid a requirement for the teeth to protrude into a bore of the seat. The cutting component may comprise a main part. The rebate may be disposed in a position which is axially adjacent to the teeth, relative to a main axis of the seat. The rebate may be disposed between the main part and the teeth, and may be axially between. The main part may have a cross-sectional width, and may be of a substantially constant width. A cross-sectional width of the cutting component in the region of the rebate may be less than the width of the main part. Crests of the teeth may lie substantially in a plane containing, or on a line intersecting with, an internal surface of the seat and/or the main part of the cutting component.

The body may be a tubular body, and may be part of a wellbore tubular. The wellbore tubular may be any tubular body that may be deployed into a well, including during drilling, completion, production and workover procedures. Non-limiting exemplary wellbore tubulars include: production tubing; tubing forming part of a tool string; and coiled tubing. The body may be a line (cable), and may be wireline or slickline.

In another aspect of the present invention, there is provided a method of cutting a body, which may be a body that is adapted to be deployed into a well (in particular an oil and/or gas well) employing the valve of the second aspect of the invention.

Further features of the method may be derived from the text set out elsewhere in this document, in particular in or with reference to the first to third aspects of the invention set out above.

Embodiments of the present invention will now be described, by way of example only, with reference to the accompanying drawings, in which:

DETAILED DESCRIPTION OF THE INVENTION

Figure 1:
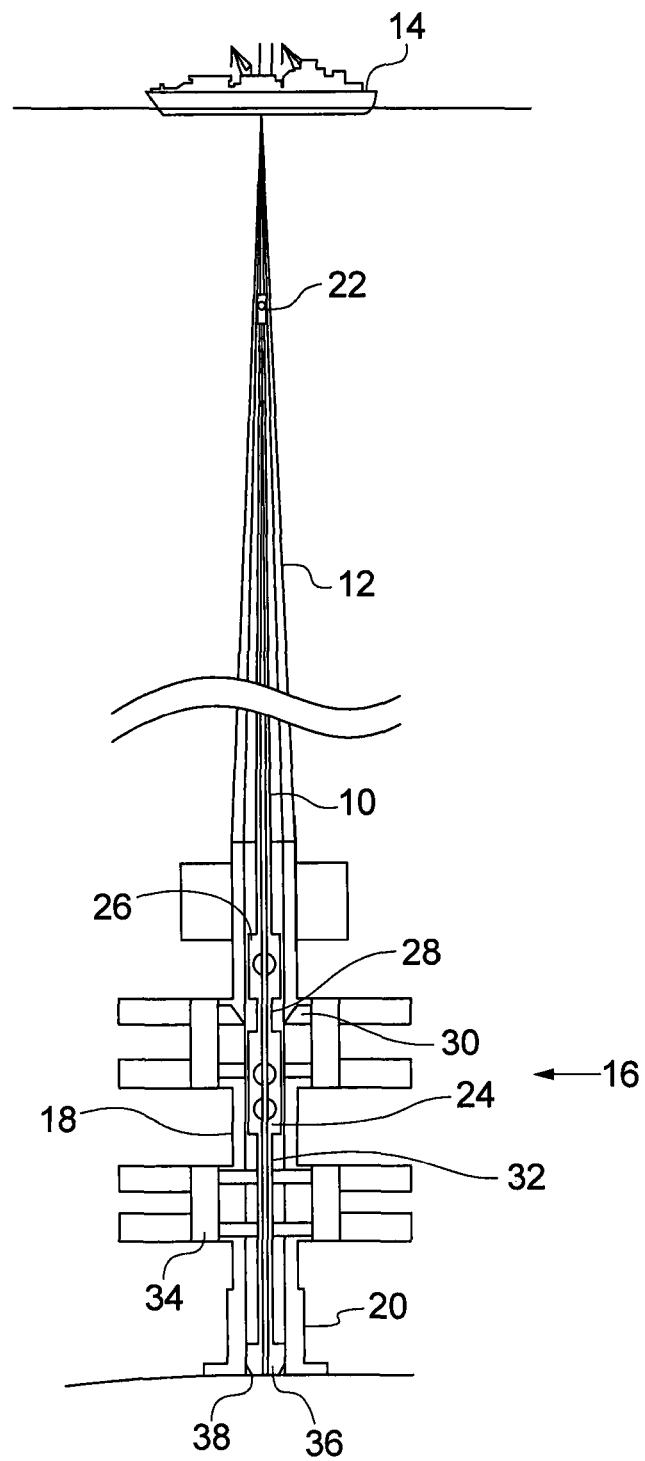
FIG. 1 is a schematic side view of a landing string incorporating a valve in the form of an SSTT valve, of a type known in the art.

Turning firstly to FIG. 1, there is shown a schematic view of a landing string assembly 10, shown in use within a riser 12 and extending between a surface vessel 14 and a subsea wellhead assembly 16 which includes a BOP 18 mounted on a wellhead 20. The use and functionality of landing strings are well known in the industry for through-riser deployment of equipment, such as completion architecture, well testing equipment, intervention tools and the like into a subsea well from a surface vessel.

When in a deployed configuration the landing string 10 extends through the riser 12 and into the BOP 18. While deployed the landing string 10 provides many functions, including permitting the safe deployment of wireline or coiled tubing equipment (not shown) through the landing string and into the well, providing the necessary primary well control barriers and permitting emergency disconnect while isolating both the well and landing string 10. Wireline or coiled tubing deployment may be facilitated via a lubricator valve 22 which is located proximate the surface vessel 14.

Well control and isolation in the event of an emergency disconnect is provided by a suite of valves, which are located at a lower end of the landing string 10 inside the BOP. The valve suite includes a lower valve assembly called the subsea test tree valve (SSTT valve or SSTT) 24 which provides a safety barrier to contain well pressure, and also functions to cut any wireline or coiled tubing which extends through the landing string 10. The valve suite also includes an upper valve assembly, typically referred to as a retainer valve 26, which isolates the landing string contents and which can be used to vent trapped pressure from between the retainer valve 26 and SSTT valve 24. A shear sub component 28 extends between the retainer valve 26 and SSTT valve 24, which is capable of being sheared by shear rams 30 of the BOP 18 if required. A slick joint 32 extends below the SSTT valve 24 which facilitates engagement with BOP pipe (seal) rams 34.

The landing string 10 may include an interface arrangement for interfacing with other oil field equipment. For example, the landing string 10 can include a tubing hanger 36 at its lowermost end, which engages with a corresponding tubing hanger 38 provided in the wellhead 20. When the landing string 10 is fully deployed and the corresponding tubing hangers 36 and 38 are engaged, the weight of the lower string (such as a completion, workover string or the like which extends into the well and thus is not illustrated) becomes supported through the wellhead 20.

Figure 2:
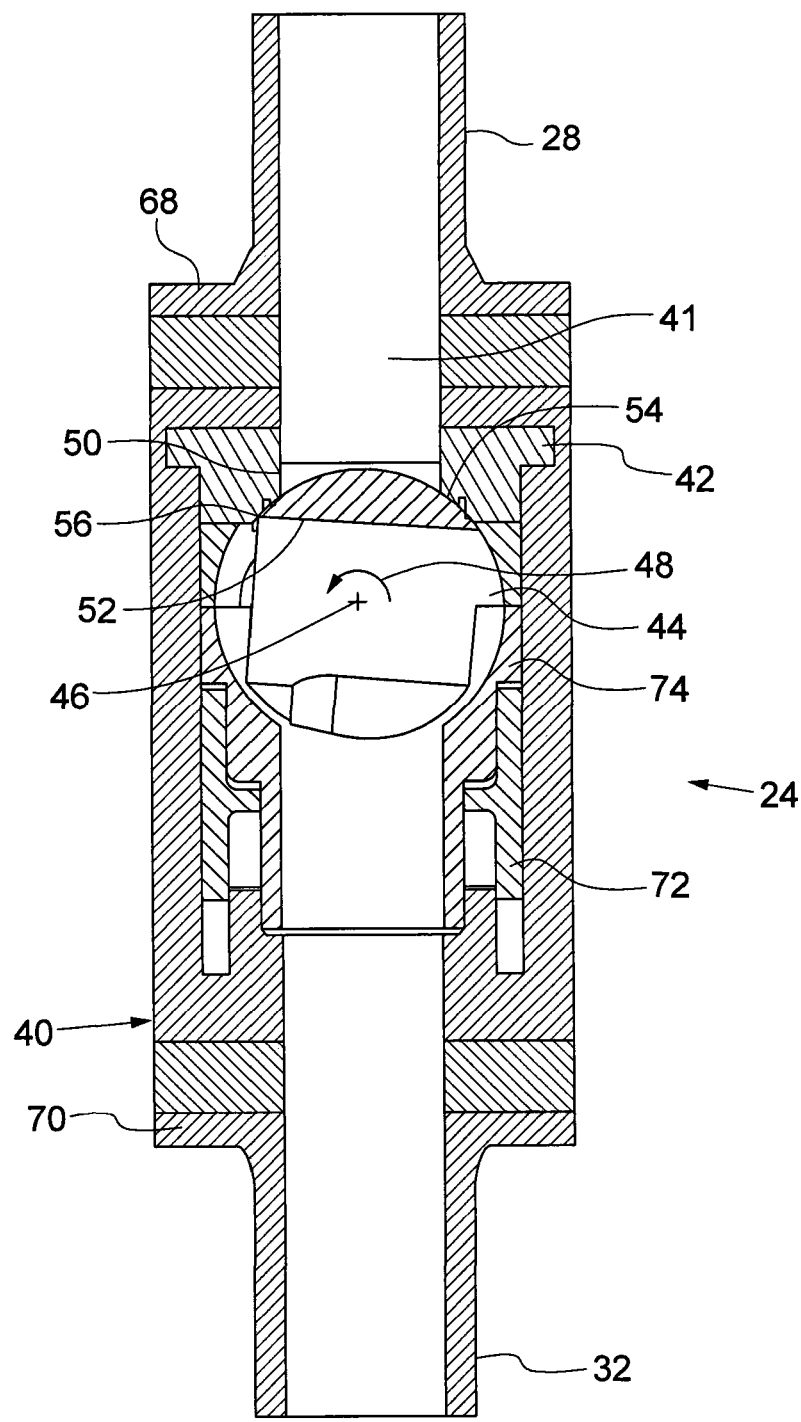
FIG. 2 is a longitudinal cross-sectional view of an SSTT type valve, of a type known in the art, and which has a use in the landing string of FIG. 1.

Referring now to FIG. 2, there is shown a longitudinal cross-sectional view of a valve which can perform various functions, and which can form part of the SSTT valve 24 of the landing string 10 shown in FIG. 1. It should be noted that although the SSTT valve 24 shown in FIG. 1 is a dual valve assembly, FIG. 2 shows only a single valve, for ease of illustration. The SSTT valve 24 is of the type disclosed in the applicant's International Patent Publication No. WO-2016/113525, the disclosure of which is incorporated herein by way of reference, and which takes the general form of a ball-type valve.

The ball valve 24 shown in FIG. 2 includes a housing, generally identified by reference numeral 40, which is secured between the upper shear sub component 28 and the lower slick joint 32. As such, the ball valve 24 is installed in-line with the landing string 10, which can be considered to be a fluid conduit system. The housing 40 has a bore 41 and accommodates a ball seat 42 and a ball member 44, the ball member 44 being rotatable about axis 46 to selectively close the ball valve 24 and control flow through the landing string 10. The illustrated ball member 44 is rotatable in the direction of arrow 48 to close the ball valve 24. The ball seat 42 and ball member 44 define respective throughbores 50 and 52. When aligned, the throughbores 50 and 52 define a flow path through the valve 24. When misaligned (as shown in FIG. 2), the throughbores 50 and 52 prevent or restrict flow through the valve. When the ball member 44 is closed, a sealing area 54 is defined between the ball seal 42 and ball member 44.

The ball member 44 is rotatable between an open position in which the throughbores 50 and 52 are aligned, and a closed position (shown in FIG. 2) in which the ball bore 52 is disposed transverse to the seat bore 50, so that the throughbores are misaligned. In the closed position, flow through the valve 24, and the passage of equipment through the valve and into the wellbore, is prevented. As described in detail in WO-2016/113525, and which will also be discussed below, a leading edge surface 56 of the ball member 44 is configured to cut through a body (not shown in FIG. 2), such as wireline, coiled tubing or the like which extends through the valve 24 and landing string 10, upon closure of the ball member 44.

The housing 40 is configured to be mechanically secured in-line with the landing string 10 (FIG. 1). The housing 40 comprises a generally cylindrical member which extends between axially opposing end flange connectors 64 and 66, which are secured to flange components 68 and 70 of the shear sub 28 and slick joint 32, respectively. The housing 40 is designed to accommodate mechanical forces, such as axial and bending forces, associated with the landing string 10 and those of any supported lower string. The housing 40 also provides pressure containment of any and all internal and/or external pressures.

The ball valve further includes an actuator assembly, generally identified by reference numeral 72, for use in actuating the ball member 44 to rotate it relative to the ball seat 42 between its open and closed positions. The actuator assembly drives a cage 74 coupled to the ball member 44, which is translated axially to rotate the ball member between its open and closed positions, via trunnions (not shown in this drawing) mounted on the ball member. In the present example, the actuator assembly 72 comprises a piston arrangement, however it should be understood that many other actuators may be used.

The present invention provides a valve seat for a valve, which may be a valve of the type shown in FIGS. 1 and 2 and described above. The invention also provides a valve comprising such a valve seat, and a cutting component for a valve of a valve seat. It should be understood that, whilst reference is made herein specifically to a valve seat for a ball-type valve, and to a ball-type valve comprising a valve seat, the present invention has a use with further types of valve, including but not limited to shear-gate type valves, comprising a valve gate which is translatable relative to a bore of a housing containing the valve gate, for selectively opening and closing the bore.

Figure 3:
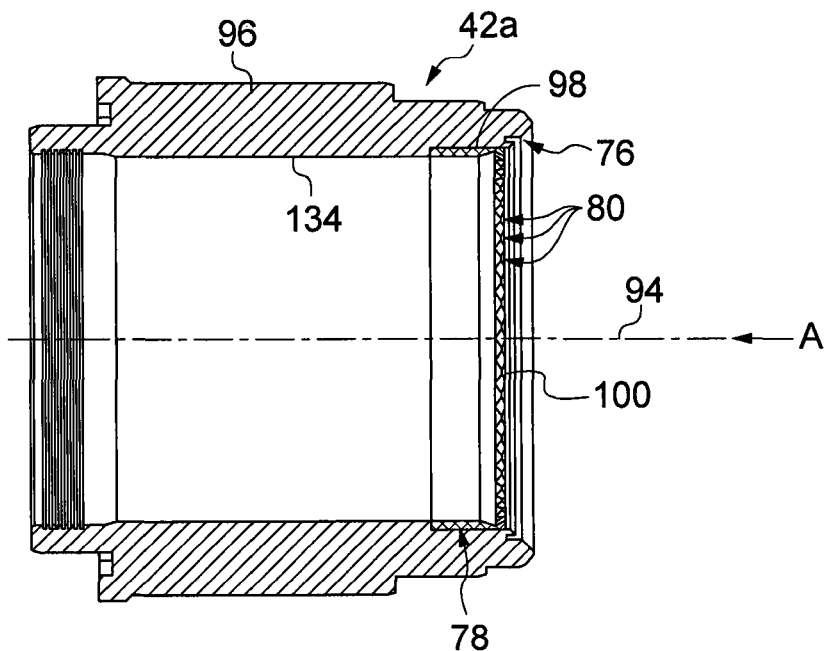
FIG. 3 is a longitudinal cross-sectional view of a valve seat in accordance with an embodiment of the present invention, including a cutting component, and which forms part of a valve incorporating the seat.

Turning now to FIG. 3, there is shown a longitudinal cross-sectional view of a valve seat according to an embodiment of the present invention, indicated generally by reference numeral 42a, and which has a use in a ball valve such as the valve 24 shown in FIGS. 1 and 2 and described above. The valve seat 42a is in many ways similar to the valve seat 42 shown in FIG. 2 and described above, like components sharing the same reference numerals with the addition of the suffix 'a'. The valve seat 42a is also shown in the perspective view of FIG. 4, and in FIG. 5, which is an enlarged detail view of part of the valve seat shown in FIG. 4.

Figure 5:
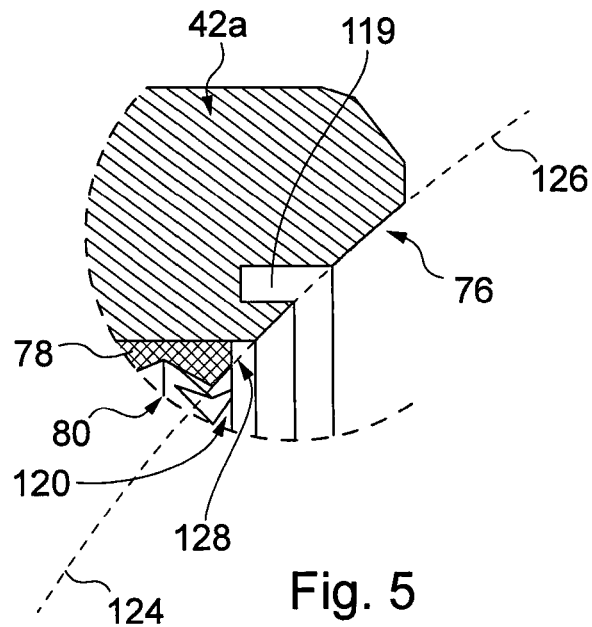
FIG. 5 is an enlarged detail view of part of the valve seat shown in FIG. 4.

The valve seat 42a generally comprises a sealing surface 76 for sealing with a valve member, the sealing surface being best shown in the enlarged detail view of FIG. 5. In the illustrated embodiment, the sealing surface 76 is for sealing with a valve member in the form of a ball valve member such as the valve member 44 of FIG. 2, and which will be shown in later drawings and discussed below.

Figure 6:
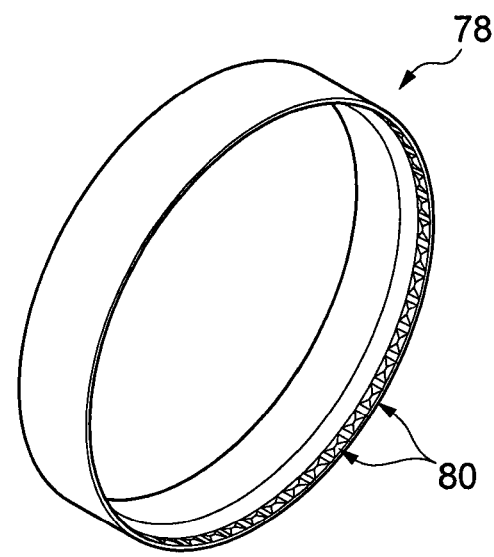
FIGS. 6, 7 and 8 are perspective, cross-sectional side and end views (taken in the direction of the arrow A in FIG. 3), respectively, of the cutting component shown in FIG. 3.
Figure 8:
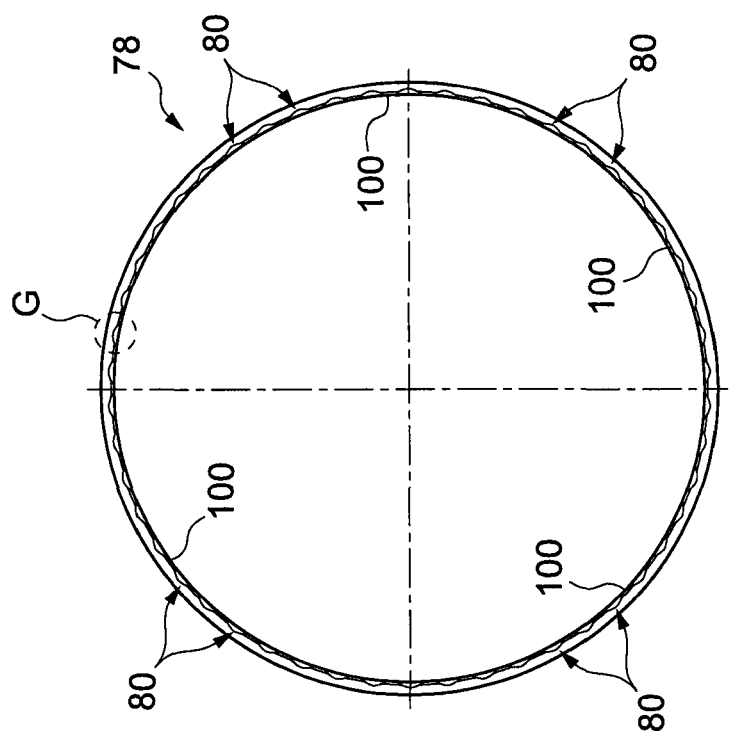
Figure 7:
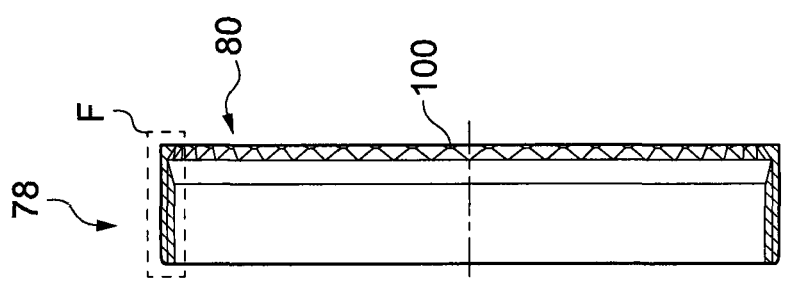

The valve seat 42a also comprises a cutting component 78 comprising a plurality of cutting teeth, a number of which are shown and given the reference numeral 80. The cutting component 78 is shown in more detail in the perspective view of FIG. 6, as well as the cross-sectional side view of FIG. 7, and the end view of FIG. 8 (taken in the direction of the arrow A in FIG. 3). The cutting teeth 80 are arranged to indent a surface of a body that is urged into contact with the cutting teeth, to facilitate cutting of the body. Exemplary bodies will be shown in later drawings and described below. The body may be a tubular body, and can be any tubular body that may be deployed into a well, including during drilling, completion, production and workover procedures. The tubular body may be a wellbore tubular or a part of a wellbore tubular. Non-limiting exemplary wellbore tubulars include: production tubing; tubing forming part of a tool string; and coiled tubing. The body may be a line (multi or monofilament cable), and may be wireline or slickline. As is well known in the industry, wirelines and slicklines are employed to deploy well tools and other equipment into a well, and provide benefits in terms of speed of deployment and recovery and tool activation (for example via electrical signals transmitted along the wireline from surface).

Figure 9:
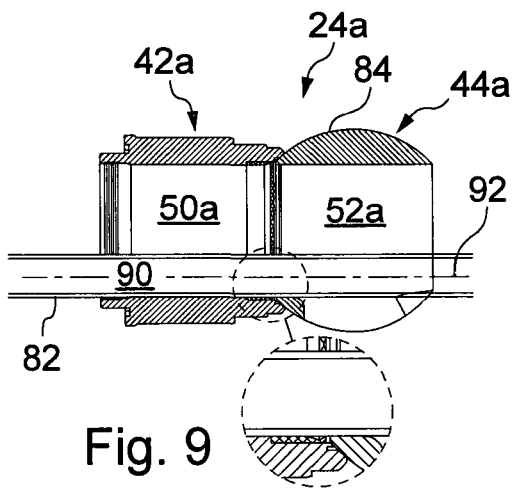
FIG. 9 is a longitudinal cross-sectional view of part of a valve comprising the valve seat and a valve member in the form of a ball-type valve member, in accordance with an embodiment of the invention, the valve shown in a fully open position.

Turning now to FIG. 9, there is shown a longitudinal cross-sectional view of part of a valve 24a comprising the valve seat 42a, and a valve member in the form of a ball-type valve member 44a, in accordance with an embodiment of the invention. The seat 42a and ball member 44a are located within a housing (not shown), such as the housing 40 shown in FIG. 2 and described above, and operate in much the same fashion. Like components of the valve 24a (and so also the ball member 44a) share the same reference numerals as the valve 24/ball member 44, with the addition of the suffix 'a'.

The valve 24a is shown in an open position in FIG. 9, an uphole side of the valve (closer to surface) being shown on the left in the drawing, and a downhole side (further from surface) on the right. The valve seat 42a has a throughbore 50a and the ball member 44a has a throughbore 52a, which are aligned in the open position of the valve 24a shown in FIG. 9.

A body in the form of coiled tubing 82 is shown positioned within the aligned bores 50, 52 and which extends from surface through the valve 24a (and so through the BOP 18 and into the well). The coiled tubing 82 may be used to perform a number of different functions within the well, for example an intervention procedure in which tools are run into the well on the tubing to perform an intervention function. The coiled tubing 82 is shown in the drawing adjacent internal walls of the valve seat 42a and ball member 44a. It will be understood that this is primarily for ease of illustration, and that the coiled tubing 82 may adopt any position within the aligned bores 50a/52a, including concentric.

Figure 12:
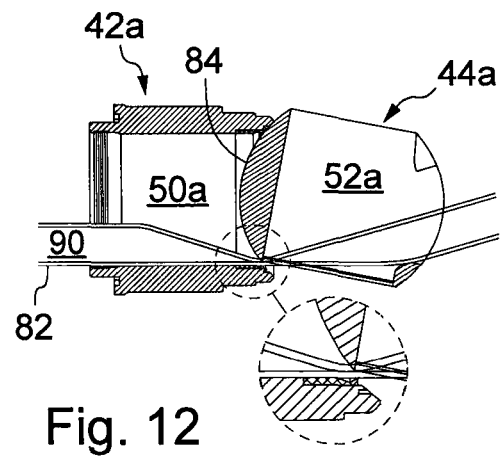
Figure 13:
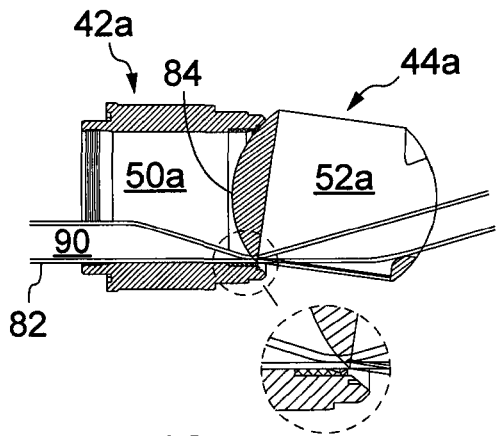
Figure 14:
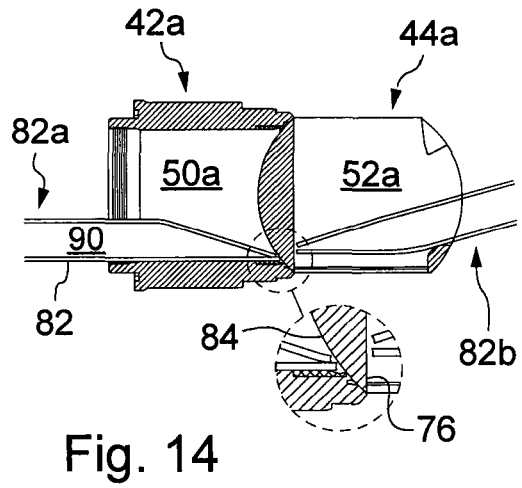

FIGS. 10 to 14 show steps in a procedure to close the valve 24a, in which the ball member 44a is rotated from the open position of FIG. 9 (in which the bores 50a/52a are aligned), to a position in which the valve is closed, shown in FIG. 14 (in which the bores 50a/52a are misaligned, as described above). Activation of the valve 24a to rotate the ball member 44a to the closed position may be required in the event, for example, of an emergency situation arising leading to a potential loss of control of the well. Closure of the valve 24a severs the coiled tubing 82 extending through the aligned bores 50a/52a and shuts-in the well. Control of the flow of fluids along the aligned bores 50a/52a is achieved by sealing contact between a sealing surface 84 on the ball member 44a, and the sealing surface 76 of the valve seat 42a.

Figure 10:
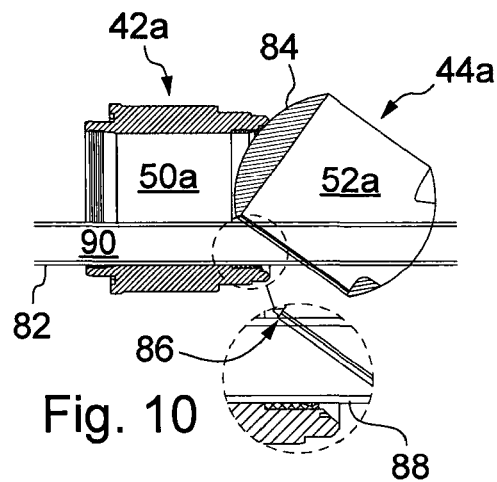
FIGS. 10 to 14 are views similar to FIG. 9, showing progressive steps in a method of cutting a body in the form of a coiled tubing located through the valve, FIG. 14 showing a final position of the ball member in which it is fully closed.

During the procedure to sever the coiled tubing 82 and shut-in the well, the ball member 44a contacts the coiled tubing and urges it towards cutting teeth 80 of the cutting component 78. FIG. 10 shows the ball member 44a in a position in which the coiled tubing 82 is clamped between a leading edge 86 of the ball member (see enlarged detail view within FIG. 10) and the valve seat 42a. In this position, a side wall 88 of the coiled tubing 82 is in contact with the cutting component 78, and in particular with selected ones of the cutting teeth 80. Following the teachings of WO-2016/113525, the leading edge 86 of the ball member 44a defines a cutting surface which acts to penetrate into the side wall 88 of the coiled tubing 82, to sever the tubing.

The valve seat 42a of the present invention, comprising the cutting component 78, provides advantages over prior valve seats. In particular, the cutting teeth 80 of the cutting component 78 indent into an outer surface of the wall 88 of the coiled tubing 82 when it is urged into contact with the teeth. The teeth 80 impart point loads on the coiled tubing 82. This results in stress concentrations in the coiled tubing 82, which greatly improves the efficiency of a procedure to cut (or sever) the tubing, by significantly reducing a load which must be imparted on the tubing to cut it, in particular by the ball member 44a. This has the benefit of reducing the risk of the ball member 44a becoming damaged during the cutting procedure, and so reduces a risk of resultant damage to the sealing surface 76 of the valve seat 42a, due to contact with a damaged ball member.

Figure 11:
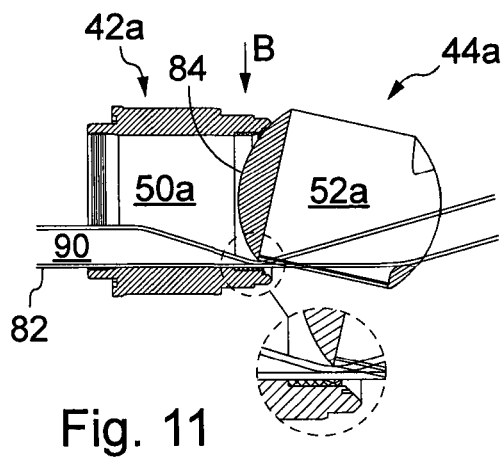

FIGS. 11 to 13 show progressive steps in cutting of the coiled tubing 82.

In FIG. 11, the coiled tubing is shown compressed between the leading edge 86 of the ball member 44a and the cutting component 78 (especially the teeth 80). As will be understood by persons skilled in the art, in this position of the ball member 44a, the coiled tubing has been crushed into a curved oval (or elliptical) shape, so that opposite surfaces of the sidewall 88 have been brought into contact. In this state, a bore 90 of the coiled tubing has been substantially closed, the coiled tubing adopting a flat curved profile largely matching the shape of the curved leading edge 86 of the ball member and the shape of the curved cutting component 78. When the coiled tubing 82 is in this state, a thickness of material at the extremities of the tubing (viewing in the direction of the arrow B in FIG. 11) is relatively large, due to the way in which the tubing is compressed. It is believed that this concentration of material has been the reason for prior ball members being damaged during a tubing cutting procedure, as the forces required to cut through this material are high.

FIG. 12 shows the coiled tubing 82 following rotation of the ball member 44a to a position where significant penetration of the tubing sidewall 88 has occurred. It should be noted here that the enlarged detail view of FIG. 12 shows that the cutting teeth 80 have not penetrated into the sidewall 88 of the tubing 82. This is purely for ease of illustration. In practice, it is understood that the teeth 80 will penetrate into the sidewall 88 to a significant degree, and will effectively start to cut or sever the tubing 82 on the side which is in contact with the teeth, in conjunction with or even ahead of the leading edge 86 of the ball member 44a.

FIG. 12 illustrates well the way in which the leading edge 86 of the ball member 44a and the cutting teeth 80 on the cutting component 78 cooperate to cut the tubing 82. Specifically, the arrangement by which the ball member 44a is required to seal with the sealing surface 76 on the seat 42a is such that the leading edge 86 and the teeth 80 are effectively opposed, with an axial stagger when the ball member 44a is in its fully closed position. This has the effect of crimping and (so deforming) the tubing 82 between the opposed leading edge 86 and the teeth 80.

FIG. 13 illustrates the ball member 44a following a further movement towards its closed position, immediately prior to complete cutting or severing of the tubing 82. It will be understood that the drawings are somewhat schematic, in that severing of the tubing is usually not achieved in a pure opposed scissors-type cutting action. This is because the force imparted upon the tubing 82 by the ball member 44a is not directed perpendicularly to an axis 92 of the tubing (FIG. 9), but rather in a direction which is at a non-perpendicular angle. This is due to the curved nature of the ball member leading edge 86, which contacts the tubing at a position which is axially spaced from the position at which tubing severing occurs, before rotating to the closed position. This is best understood by comparing FIGS. 10 and 13. The result of this is that the load imparted on the tubing 82 has both a radially directed component and an axially directed component. This has the effect of imparting an axial shear force on the tubing 82, which tends to 'tear' the tubing during the severing procedure. This effect is most noticeable on the side of the tubing 82 which is directly contacted by the leading edge 86 of the ball member 44a. This effect is exacerbated by the loading on the tubing 82, which is due not only to the self-weight of the tubing, but also the weight of tools or other equipment suspended from the tubing.

FIG. 14 shows the final position of the ball member 44a, as discussed above. The tubing 82 has been finally severed into upper and lower portions 82a and 82b, the lower portion 82b falling down the wellbore (for subsequent retrieval in a fishing procedure), and the portion 82a being recovered to surface. In its final position, the ball member leading edge 86 and the teeth 80 are axially staggered, in a direction along an axis 94 of the valve (FIG. 3), as discussed above. In this position, the sealing surface 84 on the ball member 44a is in sealing contact with the sealing surface 76 on the seat 42a. In use, fluid pressure loading on the ball member 44a tends to urge the sealing surfaces 76 and 84 into effective sealing contact, so that the ball member 44a closes and seals the bore 50a of the seat, and so the fluid flow through the valve housing 40.

Figure 15:
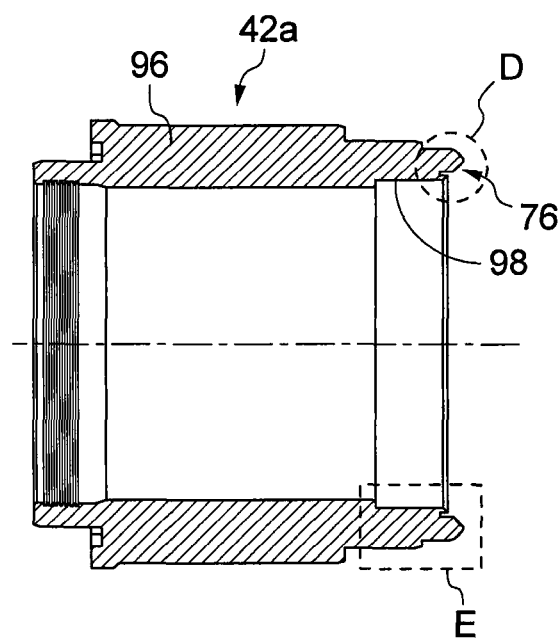
FIG. 15 is a longitudinal cross-sectional view of the valve seat of FIG. 3 shown without the cutting component.
Figure 16:
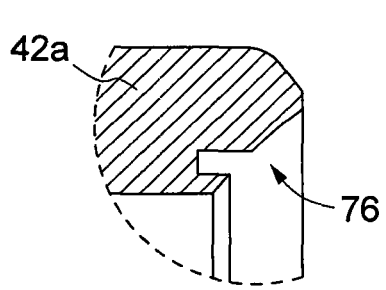
FIGS. 16 and 17 are enlarged detail views of portions of the valve seat shown in FIG. 15 and indicated at D and E in the drawing.
Figure 17:
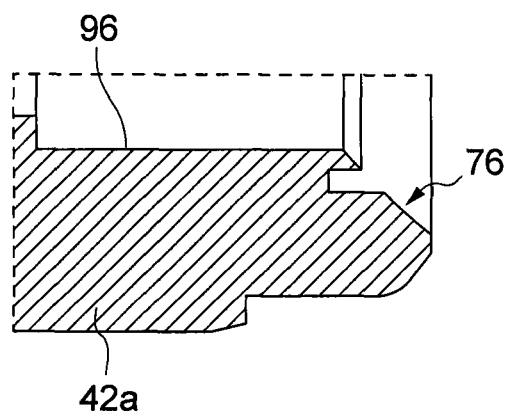
Figure 18:
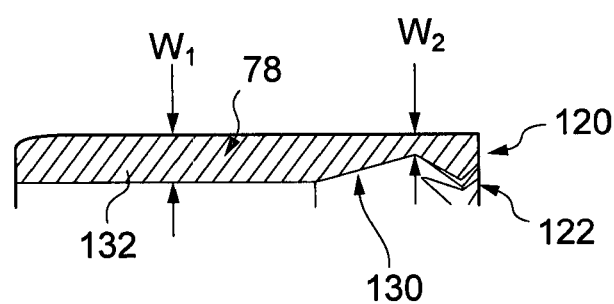
FIG. 18 is an enlarged detail view of part of the cutting component of FIG. 3, indicated at F in FIG. 7.
Figure 19:
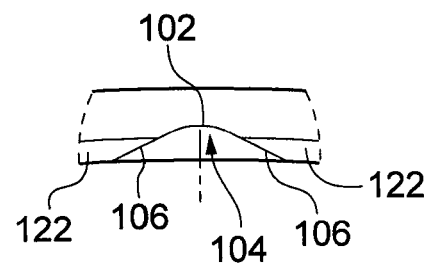
FIG. 19 is an enlarged detail view of part of the cutting component of FIG. 3, indicated at G in FIG. 8.

The cutting component 78, valve seat 42a and ball member 44a will now be described in more detail, with reference also to: FIG. 15, which is a longitudinal cross-sectional view of the valve seat 42a without the cutting component 78; FIGS. 16 and 17, which are enlarged detail views of portions of the valve seat 42a indicated at D and E in FIG. 15; FIG. 18, which is an enlarged longitudinal cross-sectional view of part of the cutting component 78 indicated at F in FIG. 7; and FIG. 19, which is an enlarged end view of part of the cutting component 78 indicated at G in FIG. 8.

As best shown in FIGS. 3 and 15, the valve seat 42a comprises a main seat part, which takes the form of a tubular housing 96, and which defines the sealing surface 76. The valve seat 42a, and in particular the seat housing 96, are mounted within the valve housing 40 in a 'floating' arrangement, which is typically required in high-debris valves and is standard in the field of ball valves. The cutting component 78 is provided separately from the seat housing 96, and is mountable within the seat housing. In preferred embodiments, the cutting component 78 is releasably mountable within the seat housing 96, which defines a recess, rebate or groove 98 which is shaped to receive the cutting component 78.

The cutting component 78 can be releasably mountable within the seat housing 96 by arranging the cutting component in an interference fit with the housing. For example, the cutting component 78 may have an external diameter which is slightly greater than an internal diameter of the recess 98. In this way and using suitable equipment, the cutting component can be press-fitted into the recess 98.

Whilst an interference fit may be provided, a preferred option for mounting the cutting component 78 within the seat housing 96 is to deform the cutting component into engagement with the seat housing (in the recess 98), following positioning of the cutting component within the housing. Deformation may be achieved in an expansion procedure, which may be a swaging procedure using a swaging tool. To achieve this, the cutting component 78 may be arranged so that it has an external diameter, prior to deformation, which is slightly less than an internal diameter of the recess 98.

The seat housing 96, and typically also the ball member 44a, are of a material having a first hardness and/or modulus of elasticity, and the cutting component 78 of a material having a second hardness and/or modulus of elasticity which is greater than the first hardness/modulus of elasticity. Optionally, the ball member 44a is provided of a material having a third hardness and/or modulus of elasticity, which is different from (typically greater than) the first hardness/modulus of elasticity of the seat housing 96, but which is less than the second hardness/modulus of elasticity of the cutting component. Suitable materials for the seat housing 96 and the ball member 44a include Inconel, which is a family of austenitic nickel-chromium-based superalloys. Inconel materials are particularly suited for the harsh environments within which ball valves deployed into a wellbore are exposed. Suitable materials for the cutting component include Tungsten Carbide.

Provision of the cutting component 78 in a material which is of a greater hardness and/or modulus of elasticity than the ball member 44a may facilitate a procedure to cut the coiled tubing 82, and in particular may reduce the loading which the ball member has to impart upon the tubing to cut it. This is because the cutting teeth 80, being of a material which is harder and/or of greater modulus than that of the ball member 44a, may effectively start to indent (and so cut) the tubing before the ball member. In particular, the cutting teeth 80 may impart increased point loads upon the tubing 82, compared to cutting teeth of a material having the same hardness and/or modulus of elasticity as the ball member 44a.

The cutting component 78 shown in the accompanying drawings is provided as a one-piece component, integrally incorporating the teeth 80. However, in a variation the cutting teeth 80 may be provided separately. For example, the cutting component 78 may comprise a mounting member (not shown) on which the cutting teeth 80 are mounted. In this example, the cutting teeth 80 may be provided of a material which is of a greater hardness and/or modulus of elasticity than a material of the mounting member.

The cutting teeth 80 are spaced apart along a dimension of the cutting component 78, which in the illustrated embodiment is a circumference of the component. The cutting teeth 80 define crests 100 (best shown in FIGS. 3 and 7), which are elongate and extend in a direction along the circumference of the cutting component 78. The crests 100 each form a cutting surface or cutting edge, and are aligned with or located on the circumference. The cutting teeth 80 are each arranged on a common circumference of the cutting component 78, and so at a common axial position along a length of the cutting component. Further sets of cutting teeth (not shown) may be provided arranged on a circumference of the cutting component 78 which is spaced from that containing the teeth 80.

The cutting teeth 80 extend from roots 102 (FIG. 19) to the crests 100, and taper towards the crests. The cutting teeth 80 taper in more than one direction towards the crest. In the illustrated embodiment, the cutting teeth 80 taper in a width direction (taken along a diameter of the cutting component 78) and also a depth direction (perpendicular to the diameter, and parallel to the housing axis 94). A trough 104 (FIG. 19) is defined between an adjacent pair of teeth, which comprises a flank 106 of one tooth 80, and a flank 106 of an adjacent tooth 80. The provision of such troughs 104 facilitates the cutting of smaller bodies, such as wireline or slickline, which may be directed by the trough to the roots 102 of the adjacent teeth 80, where the line can be cut.

Figure 4:
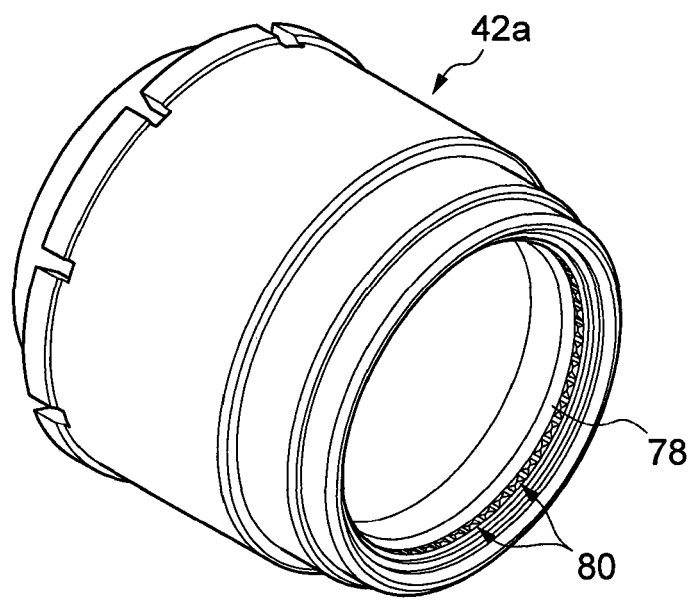
FIG. 4 is a perspective view of the valve seat shown in FIG. 3.

As best seen in FIG. 4, the cutting teeth 80 are arranged around the internal circumference of the cutting component 78, and may face towards the seat bore 50a. In the illustrated embodiment, cutting teeth 80 are arranged around substantially the entire circumference of the cutting component 78. This provides the advantage that an orientation of the cutting component 78, relative to the ball member 44a, does not impact upon cutting of the tubing 82 or other body. However, in a variation the cutting teeth 80 may be arranged around only a part of a circumference of the cutting component 78. In this situation, it may be important that an orientation of the cutting component 78 (and so the teeth 80) relative to the ball member 44a is known, to ensure a correct cutting procedure.

As discussed above, the valve member, in the illustrated embodiments, takes the form of a ball member of the type disclosed in the applicant's International Patent Publication No. WO-2016/113525, the disclosure of which is incorporated herein by way of reference. The principles of the invention may, however, be applied to other types of valves including different valve members, including but not restricted to sliding gate-type valves.

Figure 20:
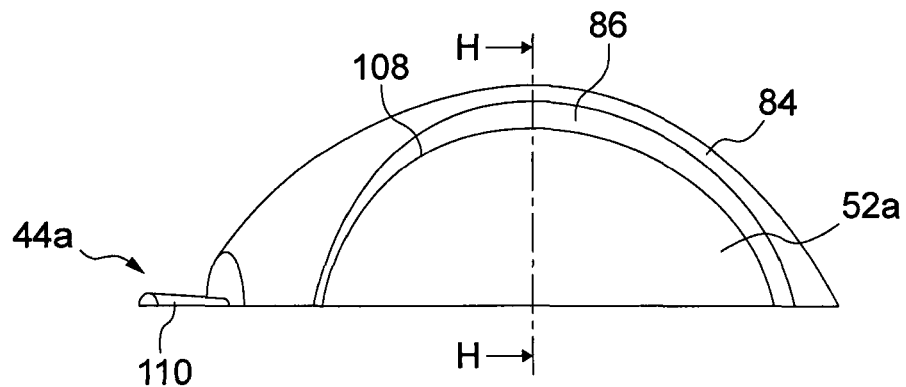
FIG. 20 is a perspective view of an upper half of the ball member of FIG. 9.

Turning to FIG. 20, there is shown a perspective view of an upper half of the ball member 44a. The illustrated ball member 44a comprises the leading edge 86, which defines a cutting surface. The throughbore 52a, sealing surface 84, a bore surface 108, and the leading edge surface 86 are shown (the latter extending between the sealing and bore surfaces 84 and 108). A trunnion 110 is also shown, of which there are two opposed across a diameter of the ball member 44a, for mounting it to the cage 74.

Figure 20A:
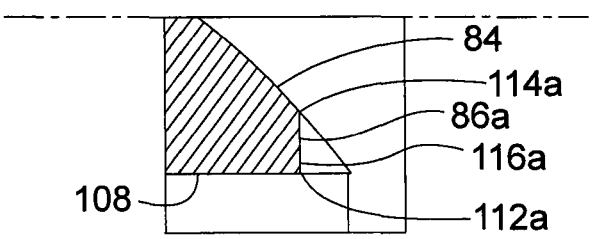
FIG. 20A is a cross-sectional view of the ball member of FIG. 20, taken along line H-H.
Figure 20B:
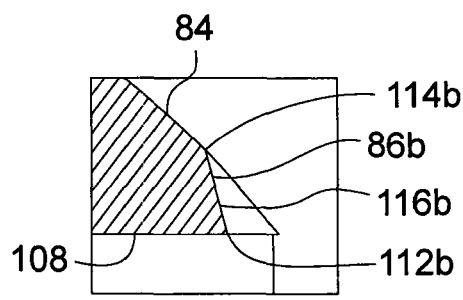
FIG. 20B to FIG. 20G are views similar to FIG. 20A, showing variations on the ball member structure.
Figure 20C:
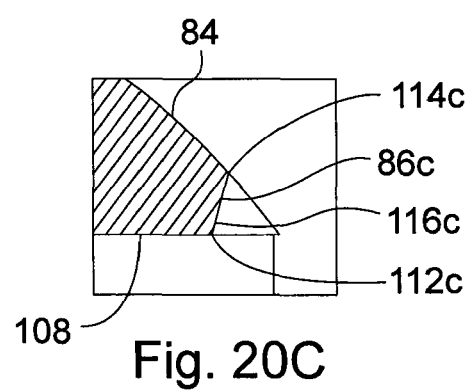

In examples shown variously in FIG. 20A (which is a cross-sectional view of the ball member 44a of FIG. 20 taken along line H-H), FIG. 20B and FIG. 20C, ball members having truncated leading edge surfaces 86a, 86b and 86c are shown. The truncated surfaces 86a to 86c extend between respective first edges 112a to 112c (defined at an interface of the truncated leading edge surfaces with the bore surface 108) and respective second edges 114a to 114c (defined at the interface of the truncated leading edge surfaces with the sealing surface 84). Respective intermediate surfaces 116a to 116c are defined between the first and second cutting edges.

Figure 20D:
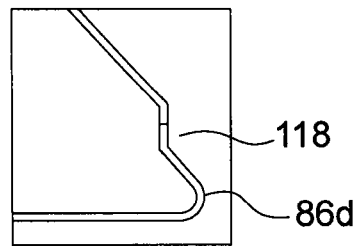

FIG. 20D shows a variation in which a relief region (or rebate/recess) 118 is provided, disposed immediately above (or behind, in a direction of rotation to close the valve) a leading edge surface 86d. The relief region 118 is configured to accommodate the leading edge surface 86d should it happen to be damaged or distorted during a cutting operation, to prevent it from scraping or damaging the valve seat 42a (in particular its sealing surface 76). The leading edge surface 86d in the embodiment shown in FIG. 20D is not truncated, but has a smoothly curved pointed shape.

The embodiments of the invention shown and described in FIGS. 3 to 17 typically employ a valve member with a relief region, but could employ any of the other constructions disclosed herein.

Figure 20E:
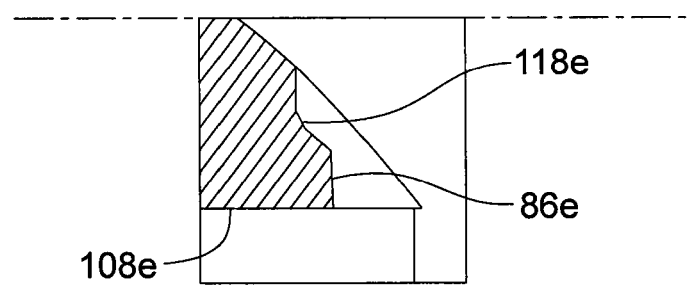
Figure 20F:
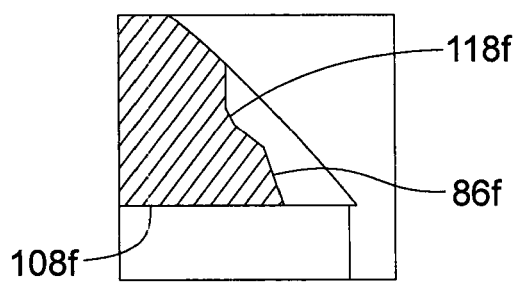
Figure 20G:
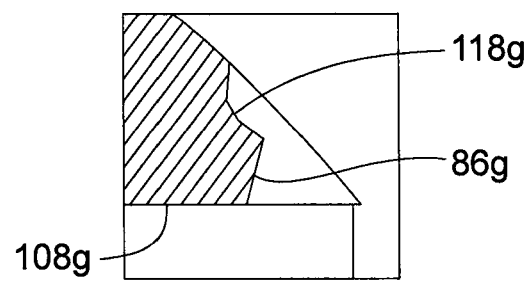

FIG. 20E shows a further variation in which a relief region 118e is disposed immediately adjacent a truncated leading edge surface 86e which is substantially perpendicular to a bore surface 108e. However, the leading edge surface may be sloped at an angle relative to the bore, which may be an obtuse or acute angle, as shown in FIGS. 20F and 20G respectively.

In the variations of the ball member architecture shown in FIGS. 20A to 20G, many features are common, and the same numerals are employed to denote similar features but with the appropriate suffix a to g.

Whichever ball member architecture is employed, the valve seat cutting component 78 is arranged to cooperate with the cutting surface 86 of the valve member 44a, to cut the tubing 82. The cutting component 78 is effectively arranged to cooperate in a scissors-type cutting arrangement, in which the cutting teeth 80, in particular crests 100 of the cutting teeth, are staggered relative to the cutting surface 86 of the ball member 44a, at least when the ball member is in its closed position (FIG. 14). The teeth 80 are staggered in a direction which is parallel to the main axis 94 of the seat and/or the housing 40 containing the seat.

Returning now to FIGS. 5 and 17 to 19, the sealing surface 76 of the valve seat 42a, and the cutting component 72, will now be discussed in more detail.

The sealing surface 76 is arcuate, in a longitudinal plane which intersects with (and contains) the main axis 94 of the seat. A seal element 119, suitably of an elastomeric or other suitable sealing material, is disposed in a recess in the sealing surface 76, for sealing contact with the seal surface 84 on the ball member 44a. The sealing surface 76 has a curvature which matches that of an external surface of the ball member 44a. This enables movement of the ball member 44a to the closed position of FIG. 14, and sealing of the ball member relative to the seat 42a (via the sealing surfaces 76 and 84).

The cutting component 78 has an axial end surface 120, which is formed partly by the cutting teeth 80, in particular by flanks 122 of the teeth. The end surface 120, in the illustrated valve seat 42a, is curved (in a longitudinal plane which intersects with the main axis 94 of the seat). A curvature of the end surface 120 matches that of the sealing surface 76 of the valve seat 42a, so that the end surface lies on an arc 124 (FIG. 5) which intersects with an arc 126 containing the arcuate sealing surface of the valve seat. The end surface 120 is arranged so that it is generally aligned with a part of the sealing surface 76 disposed proximate to the cutting component 78. An end-most face 128 of the cutting component 78 is substantially planar, and disposed transverse to the main axis 94 of the valve seat (and the housing 40 containing the seat). Shaping the cutting component 78 and the valve seat sealing surface 76 in this way facilitates a cutting and sealing procedure, in that the cutting component and the sealing surface cooperate with the substantially spherical outer surface of the ball member 44a.

As best shown in FIG. 18, the cutting component 78 comprises a rebate, recess or relief region 130, which is disposed adjacent/proximate to the cutting teeth 80. The provision of such a rebate 130 avoids a requirement for the teeth 80 to protrude into the seat bore 50a, and so contact with tubing or other equipment deployed through the valve 24, in normal use (and so prior to any emergency situation arising). In addition, the rebate 130 provides a space into which the tubing 82 can be deformed during a cutting procedure, for better contact between the tubing and the cutting teeth 80.

The cutting component 78 is in generally in the form of an annular ring and comprising a main part 132, the rebate 130 being disposed in a position which is axially adjacent to the teeth 80, relative to the main axis 94 of the seat 42a. The rebate 130 is disposed axially between the main part 132 and the teeth 80. The main part 132 has a substantially uniform cross-sectional width $W_1$. A cross-sectional width $W_2$ of the cutting component 78 in the region of the rebate 130 is less than the width $W_1$ of the main part. The crests 100 of the teeth 80 lie substantially in a plane containing (or on a line intersecting) an internal surface 134 of the seat 42a and the main part 132 of the cutting component 78.

Operation of a valve comprising the valve seat (including the cutting component) described above provides significant advantages over prior valves, in particular by reducing cutting loads experienced by the valve member, and so reduces the risk of damage to the valve member and therefore the sealing surface of a valve seat that the valve member cooperates with.

Various modifications may be made to the foregoing, without departing from the spirit or scope of the present invention.

What is claimed is:

1. A valve seat comprising:
   a sealing surface for sealing with a valve member; and
   a generally annular cutting component comprising a plurality of cutting teeth which are arranged to indent a surface of a body that is urged into contact with the cutting teeth, to facilitate cutting of the body, in which the cutting teeth are spaced apart along a circumference of the cutting component and each define an elongate crest.

2. The valve seat as claimed in claim 1, in which the cutting teeth are arranged on a common circumference of the cutting component, and at a common axial position along a length of the cutting component.

3. The valve seat as claimed in claim 1, in which the elongate crests of the cutting teeth extend in a direction along the circumference of the cutting component.

4. The valve seat as claimed in claim 1, in which the valve seat comprises a main seat part defining the sealing surface, and in which the cutting component is provided separately from the main seat part and is mountable within the main seat part.

5. The valve seat as claimed in claim 4, in which the main seat part defines a recess adapted to receive the cutting component.

6. The valve seat as claimed in claim 5, in which the cutting component has an external dimension which is less than an internal dimension of the recess.

7. The valve seat as claimed in claim 4, in which the main seat part is of a material having a first hardness and/or modulus of elasticity, the cutting component is of a material having a second hardness and/or modulus of elasticity, and the second hardness and/or modulus of elasticity is greater than the first hardness/modulus of elasticity.

8. The valve seat as claimed in claim 1, in which the cutting teeth extend from a root to the crest, and taper towards the crest.

9. The valve seat as claimed in claim 8, in which the cutting teeth taper in more than one direction towards the crest.

10. The valve seat as claimed in claim 1, in which a trough is defined between an adjacent pair of teeth, which comprises a flank of one tooth and a flank of an adjacent tooth.

11. The valve seat as claimed in claim 1, in which cutting teeth are arranged around substantially an entire circumference of the cutting component.

12. The valve seat as claimed in claim 1, in which:
    the sealing surface of the valve seat is curved, in a longitudinal plane; and
    the cutting component has an axial end surface formed at least partly by the cutting teeth, in which the end surface is curved in a longitudinal plane, a curvature of the end surface matching that of the sealing surface of the valve seat.

13. The valve seat as claimed in claim 12, in which the end surface of the cutting component lies on an arc which intersects with an arc containing the arcuate sealing surface of the valve seat.

14. The valve seat as claimed in claim 1, in which the cutting component comprises at least one rebate disposed adjacent to the cutting teeth.

15. The valve seat as claimed in claim 14, in which the cutting component comprises a main part, and in which the rebate is disposed in a position which is axially adjacent the teeth and in which the main part has a substantially constant cross-sectional width, a cross-sectional width of the cutting component in the region of the rebate being less than the width of the main part.

16. The valve seat as claimed in claim 15, in which the crests of the teeth lie substantially in a plane containing an internal surface of the seat and the main part of the cutting component.

17. A valve comprising:
- a housing having a bore;
- a valve seat arranged within the housing in communication with the bore, the valve seat comprising a sealing surface and a generally annular cutting component comprising a plurality of cutting teeth; and
- a valve member which is movable relative to the housing between an open position where the housing bore is open and the valve member is out of sealing contact with the sealing surface of the valve seat, and a closed position where the housing bore is closed by the valve member and the valve member is in sealing contact with the sealing surface of the valve seat to thereby seal the bore;
- in which the plurality of cutting teeth of the valve seat cutting component are arranged to indent a surface of a body located within the housing bore, to facilitate cutting of the body, the body being urged into contact with the cutting teeth by the valve member when the valve member is moved to its closed position, the cutting teeth being spaced apart along a circumference of the cutting component and each defining an elongate crest.

18. The valve as claimed in claim 17, in which the valve member is of a material having a first hardness and/or modulus of elasticity, the cutting component is of a material having a second hardness and/or modulus of elasticity, and the second hardness and/or modulus of elasticity is greater than the first hardness/modulus of elasticity.

19. The valve as claimed in claim 17, in which the valve seat is of a material having a first hardness and/or modulus of elasticity; the cutting component is of a material having a second hardness and/or modulus of elasticity, the second hardness and/or modulus of elasticity being greater than the first hardness/modulus of elasticity; and in which the valve member is of a material having a third hardness and/or modulus of elasticity, which is greater than the first hardness/modulus of elasticity but less than the second hardness/modulus of elasticity.

\* \* \* \* \*